United States Patent
Pan et al.

(10) Patent No.: US 12,412,033 B2
(45) Date of Patent: Sep. 9, 2025

(54) KNOWLEDGE GRAPH DRIVEN CONTENT GENERATION

(71) Applicant: International Business Machines Corporation, Armonk, NY (US)

(72) Inventors: Qian Pan, Canton, MA (US); James Johnson, Somerville, MA (US); Zahra Ashktorab, Brooklyn, NY (US); Casey Dugan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 17/709,520

(22) Filed: Mar. 31, 2022

(65) Prior Publication Data
US 2023/0316101 A1    Oct. 5, 2023

(51) Int. Cl.
*G06F 40/284* (2020.01)
*G06F 40/232* (2020.01)
*G06F 40/40* (2020.01)

(52) U.S. Cl.
CPC .......... *G06F 40/284* (2020.01); *G06F 40/232* (2020.01); *G06F 40/40* (2020.01)

(58) Field of Classification Search
CPC ...... G06F 40/284; G06F 40/232; G06F 40/40; G06F 40/30; G06F 40/242; G06F 40/35; G06F 16/367; G06F 16/31; G06F 16/3329; G06F 16/3344; G06N 3/09; G06N 5/022
See application file for complete search history.

(56) References Cited

U.S. PATENT DOCUMENTS

| | | |
|---|---|---|
| 10,496,747 B2 | 12/2019 | Lin |
| 10,701,042 B2 | 6/2020 | Thakurta |
| 10,810,373 B1 | 10/2020 | Pappu |
| 2009/0313017 A1 | 12/2009 | Nakazawa |
| 2012/0158633 A1 | 6/2012 | Eder |
| 2013/0246045 A1 | 9/2013 | Ulanov |

(Continued)

FOREIGN PATENT DOCUMENTS

| | | |
|---|---|---|
| CN | 102930055 A | 2/2013 |
| CN | 103970733 A | 8/2014 |

(Continued)

OTHER PUBLICATIONS

Yoo et al. (SoYeop Yoo, OkRan Jeong, "Automating the expansion of a knowledge graph," Expert Systems with Applications, vol. 141, 2020, 112965, ISSN 0957-4174, https://doi.org/10.1016/j.eswa.2019. 112965 (https://www.sciencedirect.com/science/article/pii/S0957417419306839)). (Year: 2020).*

Abel, A., et al., "On the Detection of Neologism Candidates as Basis for Language Observation and Lexicographic Endeavours: the STyrLogism Project", Institute of Applied Linguistics, Eurac Research, Euralex (2018).

(Continued)

*Primary Examiner* — Pierre Louis Desir
*Assistant Examiner* — Keisha Y. Castillo-Torres
(74) *Attorney, Agent, or Firm* — Patterson + Sheridan, LLP

(57) ABSTRACT

Embodiments are provided that related to a computer system, a computer program product, and a computer-implemented method for dynamically managing knowledge graphs and their corresponding datasets. Embodiments include identifying a neologism from a virtual environment, and leveraging a virtual environment exploration to resolve a meaning of the identified neologism. The resolved meaning of the neologism is applied to a dynamic expansion of a dataset and a corresponding knowledge graph.

17 Claims, 6 Drawing Sheets

(56) References Cited

U.S. PATENT DOCUMENTS

| | | | |
|---|---|---|---|
| 2018/0196796 A1* | 7/2018 | Wu | G06F 40/289 |
| 2019/0188617 A1* | 6/2019 | Copeland | G06Q 10/06311 |
| 2019/0340201 A1* | 11/2019 | Havens | G06N 20/00 |
| 2020/0152173 A1* | 5/2020 | Smith | G10L 15/16 |
| 2021/0056264 A1 | 2/2021 | Malak | |
| 2022/0122731 A1* | 4/2022 | Chen | G06F 16/24578 |
| 2022/0335553 A1* | 10/2022 | Chew | G06F 16/35 |
| 2023/0289619 A1* | 9/2023 | Hodos | G06N 20/00 |

FOREIGN PATENT DOCUMENTS

| | | |
|---|---|---|
| CN | 105956158 A | 9/2016 |
| CN | 106202051 A | 12/2016 |
| CN | 106528523 A | 3/2017 |
| CN | 105630890 | 6/2017 |
| CN | 107368468 | 11/2017 |
| CN | 116894093 A | 10/2023 |
| JP | 2023-152948 A | 10/2023 |

OTHER PUBLICATIONS

Bockhorst, Joseph, et al., "Knowledge Graph-Driven Conversational Agents", 33rd Conference on Neural Information Processing Systems (NeurIPS 2019), Vancouver, Canada (2019).

Ruiz-Casado, M., et al., "Automatic extraction of semantic relationships for WordNet by means of pattern learning from Wikipedia", NLDB'05: Proceedings of the 10th international conference on Natural Language Processing and Information Systems, Jun. 2005, pp. 67-79.

Wang, Ke, et al., "Research on Neologism Detection in Entity Attribute Knowledge Acquisition", Advances in Engineering, vol. 126, 5th International Conference on Machinery, Materials and Computing Technology (2017).

Xu, Fang, "Enhancing Knowledge Acquisition Systems with User Generated and Crowdsourced Resources", Dissertation, University des Saarlandes, (2012).

Yoo, SoYeop, et al., "Automating the expansion of a knowledge graph", Expert Systems With Applications 141 (2020) 112965.

* cited by examiner

KNOWLEDGE GRAPH DRIVEN CONTENT GENERATION

BACKGROUND

The present embodiments relate to an artificial intelligence (AI) platform and associated methodology to support automatic management of a knowledge graph (KG). More specifically, the embodiments relate to exploration of a natural language (NL) conversation and identification of one or more neologisms therein, and management of the KG to address the identified neologism(s).

Language evolution is the application of evolutionary theory to the study of language. As language evolves, vocabulary words and usage are subject to change. There are two stages commonly found in language evolution, including protologism and neologism. Protologism is a precursor to the neologism stage. More specifically, protologism is directed at the stage in which a new or non-established word is proposed to a limited group of population with the hope of it becoming an accepted work. A protologism becomes a neologism when the word(s) or expression becomes newly coined. In an embodiment, the neologism is also referred to as coinage. As languages and usages within the languages evolve, new neologisms arise. Not all neologisms are entirely new. For example, a neologism may be a new use for an old word, or in an embodiment the neologism may result from a new combination of existing words. The following words are a few examples of neologisms: webinar, malware, blogosphere, where webinar is coined as a term for a seminar on the web or Internet, malware is coined as a term for software designed to interfere with a computer's normal function, and blogosphere is coined as a term for blogs or bloggers on the Internet. These are just a few examples of neologisms.

Neologisms are often driven by changes in culture and technology, and are predominantly collected or identified via manual detection of new word usages, e.g. slang, idioms, technical terms, etc. The manual detection or identification requires labor, and as such is expensive. Similarly, machine learning models have been developed to collect neologisms by crawling social media. Such machine learning models use pre-trained language models to extract a relationship between words. However, the relationship extractions are limited in that the model can only extract relationships that are defined or present in one or more labels of a corresponding dataset. Accordingly, there is a need in the art to develop an apparatus or process to automate detection of neologisms without the limitations or the manual or machine learning techniques solutions.

SUMMARY

The embodiments include a system, a computer program product, and a method for leveraging a virtual environment to dynamically expand a knowledge graph. This Summary is provided to introduce a selection of representative concepts in a simplified form that are further described in the Detailed Description. This Summary is not intended to identify key features or essential features of the claimed subject matter, nor is it intended to be used in any way that would limit the scope of the claimed subject matter.

In one aspect, a computer system is provided with a processing unit and memory for use with an artificial intelligence (AI) computer platform for selective and dynamic expansion of a dataset. The processing unit is operatively coupled to the memory and is in communication with the AI platform and embedded tools, which include a token manager and a director. The token manager is configured to identify a neologism in a virtual environment exploration, and to evaluate the neologism against a representation of a dataset. The evaluation includes discovery of absence or presence of the neologism in the dataset. In an exemplary embodiment, the evaluation includes the token manager to leverage two or more virtual explorations to validate the identified token, with each exploration generating a corroboration value of the identified token. Through the discovery, a potential meaning of the token representation of the neologism is obtained from the dataset if the representation is not discovered in the dataset, and a new meaning is extracted from the dataset if the representation is discovered in the dataset. The director is configured to dynamically amend the dataset based on the discovery by the token manager. The dynamic amendment includes an update of a knowledge graph representation of the dataset commensurate with the amended dataset. The knowledge graph update includes adding the identified token as a new node in the knowledge graph, adding the new meaning as a new edge in the knowledge graph, or a combination thereof.

In another aspect, a computer program product is provided with a computer readable storage medium or media, the program code stored on the computer readable storage medium or media. The program code is executable by a computer processor to support selective and dynamic expansion of a dataset. Program code is provided to identify a neologism in a virtual environment exploration, and to evaluate the neologism against a representation of a dataset. The evaluation includes discovery of absence or presence of the neologism in the dataset. In an exemplary embodiment, the evaluation includes leveraging two or more virtual explorations to validate the identified token, with each exploration generating a corroboration value of the identified token. Through the discovery, a potential meaning of the token representation of the neologism is obtained from the dataset if the representation is not discovered in the dataset, and a new meaning is extracted from the dataset if the representation is discovered in the dataset. Program code is further provided to dynamically amend the dataset based on the discovery. The dynamic amendment includes an update of a knowledge graph representation of the dataset commensurate with the amended dataset. The knowledge graph update includes program code to add the identified token as a new node in the knowledge graph, add the new meaning as a new edge in the knowledge graph, or a combination thereof.

In yet another aspect, a computer-implemented method is provided for selectively and dynamically expanding a dataset. The method is configured to identify a neologism in a virtual environment exploration, and to evaluate the neologism against a representation of a dataset. The evaluation includes discovery of absence or presence of the neologism in the dataset. In an exemplary embodiment, the evaluation includes the token manager to leverage two or more virtual explorations to validate the identified token, with each exploration generating a corroboration value of the identified token. Through the discovery, a potential meaning of the token representation of the neologism is obtained from the dataset if the representation is not discovered in the dataset, and a new meaning is extracted from the dataset if the representation is discovered in the dataset. The method is configured to dynamically amend the dataset based on the discovery. The dynamic amendment includes an update of a knowledge graph representation of the dataset commensurate with the amended dataset. The knowledge graph update includes adding the identified token as a new node in the knowledge graph, adding the new meaning as a new edge in the knowledge graph, or a combination thereof.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
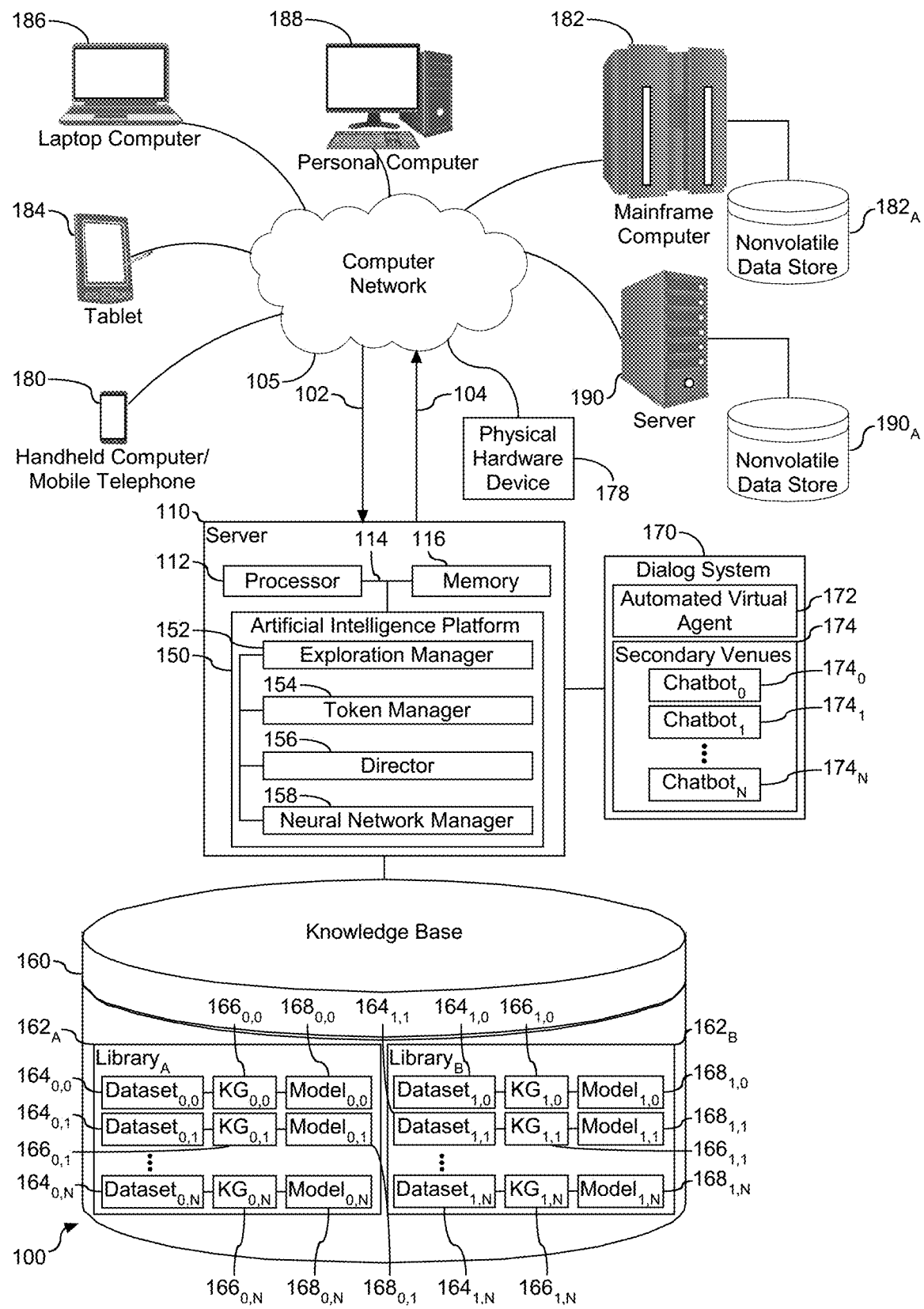
FIG. 1 depicts a system diagram illustrating an artificial intelligence platform computing system and tools to support dynamic knowledge graph management and expansion.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificially intelligent computer systems, natural language systems (such as the IBM Watson® artificially intelligent computer system or and other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

An automated virtual dialog agent, referred to herein as a chatbot, uses artificial intelligence (AI) as a platform to conduct a natural language (NL) interaction between the automated virtual dialog agent and, typically, a user such as a consumer or client or even another dialog agent. The interaction may involve product sales, customer service, information acquisition, or other types of interactions or transactions. Chatbots interact with the user through dialog, often either textual (e.g., online or by text) or auditory (e.g., by telephone). It is known in the art for the chatbot to function as a question-answer component between a user and the AI platform. The chatbot may search for an answer to a presented question from a knowledge source, ask for clarity, or in an embodiment direct the user to a human.

As shown and described herein, a system, computer program product, and method are provided to automatically update or amend an existing dataset, and in an embodiment updated a corresponding knowledge graph to reflect to the updated or amended dataset, to address and support neologisms. It is understood in the art that a knowledge graph is a representation of a knowledge base or dataset that uses a graph structured data model or topology to integrate data. The knowledge graph represents knowledge as content and concepts, and relationships between such content and concepts in a graphical format. In an embodiment, the knowledge graph representation of the dataset includes an ontology that is both human and computer readable, with concepts or objects (also referred to herein as content) represented as nodes and relationships between the concepts or objects represented as edges or links. As shown and described herein, a computer system, computer program product, and computer implemented method are provided to effectively detect, collect, and validate neologisms, and to dynamically expand or amend an existing or corresponding dataset and an associated knowledge graph with the validated neologisms.

Referring to FIG. 1, a schematic diagram of an artificial intelligence platform computing system (100) is depicted with tools to support dynamic knowledge graph management and expansion. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) configured with one or more tools to support and enable dynamic expansion of a dataset, which in an embodiment is configured or represented as a knowledge graph. The server (110) is in communication with one or more of the computing devices (180), (182), (184), (186), (188), and (190) over the network (105). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured to receive input (102) from various sources. For example, the knowledge engine (150) may receive input across the network (105) and/or leverage a knowledge base (160), also referred to herein as a corpus or data source. As shown, the knowledge base (160) is configured with one or more libraries. For exemplary purposes, the knowledge base (160) is shown herein with two libraries, referred to as a first library, library$_A$ (162$_A$), and a second library, library$_B$ (162$_B$). However, the quantity of libraries should not be considered limiting. The first library$_A$ (162$_A$) is configured to store one or more datasets, which is known in the art as a collection of related, discrete items of related data that may be accessed individually or in combination, or managed as a whole entity. By way of example, the first library (162$_A$) is shown with dataset$_{0,0}$ (164$_{0,0}$), dataset$_{0,1}$ (164$_{0,1}$), . . . , and dataset$_{0,N}$ (164$_{0,N}$), and the second library, library$_B$ (162$_B$) is shown with dataset$_{1,0}$ (164$_{1,0}$), dataset$_{1,1}$ (164$_{1,1}$), . . . , and dataset$_{1,N}$ (164$_{1,N}$). In an embodiment, the first library, library$_A$ (162$_A$), and the second library, library$_B$ (162$_B$) may individually include a reduced quantity of datasets or an enlarged quantity of datasets. Similarly, in an embodiment, the knowledge base (160) may include multiple libraries which are organized or subject to organization by common subjects or themes, although this is not a requirement. In an embodiment, the second library (162$_B$) may be positioned in a separate knowledge base (not shown). The datasets represented in the first library (162$_A$) are individually shown with a corresponding knowledge graph. By way of example, dataset$_{0,0}$ (164$_{0,0}$) is shown with knowledge graph, KG$_{0,0}$ (166$_{0,0}$), dataset$_{0,1}$ (164$_{0,1}$) is shown with knowledge graph, KG$_{0,1}$ (166$_{0,1}$), . . . , and dataset$_{0,N}$ (164$_{0,N}$) is shown with knowledge graph, KG$_{0,N}$ (166$_{0,N}$), and dataset$_{1,0}$ (164$_{1,0}$) is shown with knowledge graph, KG$_{1,0}$ (166$_{1,0}$), dataset$_{1,1}$ (164$_{1,1}$) is shown with knowledge graph, KG$_{1,1}$ (166$_{1,1}$), . . . , and dataset$_{1,N}$ (164$_{1,N}$) is shown with knowledge graph, KG$_{1,N}$ (166$_{1,N}$). In an embodiment, the knowledge base (160) may be pre-populated with datasets and corresponding knowledge graphs. Similarly, in an embodiment, the knowledge graph may be created for a corresponding dataset, which includes using natural language processing (NLP) to extract and analyze one or more phrases from a corresponding knowledge article or dataset, with the extracted and analyzed one or more phrases referring to one or more nouns, e.g. physical objects. NLP is further leveraged to identify one or more relation words between extracted phrases. The identified objects are assigned to one or more nodes, and the one or more relation words are assigned to one or more corresponding edges. In an embodiment, a relation word describes a connection between objects noted or referenced in the extracted phrases. Tools for creating the knowledge graph are known in the art, and in an embodiment may be leveraged in the AI platform (150).

The AI platform (150) is provided with tools to support and enable selective and dynamic modification of a dataset, which in an embodiment is in the form of expansion of the dataset. In an exemplary embodiment, one or more of the datasets and their corresponding knowledge graph representations in the knowledge base (160) may be communicated to the server (110) across the network (105). The tools include, but are not limited to, an exploration manager (152), a token manager (154), a director (156), and a neural network manager (158). The AI platform (150) may receive input from the network (105) or leverage the knowledge base (160) to selectively and dynamically manage a dataset and a corresponding knowledge graph, to support content generation and maintenance.

Natural language processing (NLP) refers to a branch of computer science, and more specifically artificial intelligence (AI), that addresses an ability of a computer program to understand human language as it is written and spoken. NLP combines computational linguistics with statistical, machine learning, and deep learning models to enable processing of human language in the form of text or voice data and to understand its full meaning. It is understood in the art that the chatbot is a computer program that uses AI and NLP to understand dialog, such as questions, and automate responses, thereby simulating human conversation. As shown herein, the server (110) is operating coupled to a dialog system (170) and a corresponding or embedded virtual dialog agent (172), e.g. chatbot. In an exemplary embodiment, the tools (152)— (158) interface with the chatbot (172) as the virtual environment that is the subject of the data exploration. Similarly, in an embodiment, the tools (152)— (158) interface with a plurality of virtual environments, such as two or more chatbot interfaces, for corroboration of the neologism.

The exploration manager (152) is configured to explore a virtual environment, which in an embodiment is a virtual venue, including but not limited to, a virtual dialog environment, e.g. chatbot, one or more crowdsourced dictionaries, distributed repositories, or a combination thereof. In an embodiment, the functionality of the exploration manager (152) is supported by NLP. In an exemplary embodiment, the exploration manager (152) identifies at least one dataset in the knowledge base (160) that is related to the virtual environment subject to the exploration. For example, the first library, library$_A$, (160A) may include one or more datasets individually related to aspects of information technology (IT), with individual datasets directed to different subsets of IT. As shown and described above, each of the datasets in the knowledge base (160) is associated with or has an associated knowledge graph. Each knowledge graph includes nodes and edges, with individual nodes representing a physical object or component referenced or identified in the dataset, and individual edges, with each edge representing a state characteristic of the physical object or component.

The token manager (154), which is operatively coupled to the exploration manager (152), functions as a tool to identify one or more tokens in the explored virtual environment that represent a neologism. A token is known in the art as an instance of a sequence of characters grouped together as a semantic unit. In an exemplary embodiment, the token manager (154) is responsible for tokenization of data in the explored virtual environment, with the tokenization being a process of turning pieces of data into string characters. For example, in an embodiment, the pieces of data may be words or phrases, with an individual token representing the individual words or phrases. In association with the virtual environment exploration, the token manager (154) may encounter words and phrases that may represent or in fact be a neologism. In addressing the challenges of a neologism, or in an embodiment a possible neologism, is that the meaning of the encountered word or phrases is not understood or recognized. To resolve the neologism or possible neologism encounter, the token manager (154) identifies an appropriate or corresponding dataset from the data source (160) or across the network (105), and processes the neologism or possible neologism against the dataset. In an exemplary embodiment, the token manager (154) tokenizes the encountered neologism or possible neologism and processes the token in view of the corresponding dataset, or in an embodiment a tokenized dataset. For example, the token manager (154) may find the possible neologism in the dataset and represented in the corresponding knowledge graph and discard the encounter as a neologism, or may not find a node representing the possible neologism in the knowledge graph and designate the possible neologism as a neologism. Accordingly, the token manager (154) bridges the virtual environment exploration with the neologism identification.

It is understood in the art of NLP and virtual environment exploration that words or phrases may be the subject of a mis-spelling. The token manager (154) is configured to address this aspect, and more specifically to review the spelling of the token(s) to ensure that the representation of the natural language is correct, which in an embodiment includes a spelling correction. If the token manager (154) subjects one or more tokens to a spelling correction, then the token manager conducts an evaluation of the corrected words or phrases against the dataset. Accordingly, in an embodiment, the spelling of the token(s) is subject to validation to ensure correct processing of the neologism.

In addition to the initial or potential neologism identification, the token manager (154) is configured to conduct an evaluation of the potential neologism. As described herein, and further illustrated in FIG. 3, the token manager (154) evaluates the potential neologism against a corresponding dataset, or in an embodiment a knowledge graph representation of the dataset. In an exemplary embodiment, the token manager (154) tokenizes the potential neologism such that the evaluation leverages the token representation of the neologism. It is understood that the evaluation will result in the token manager (154) discovery that either there is no representation of the neologism in the knowledge graph, i.e. no corresponding knowledge graph node, or there is a representation but there is no corresponding meaning or association present in the knowledge graph, i.e. there is a corresponding knowledge graph node but there is no corresponding edge. If the representation of the neologism is not discovered in the knowledge graph, then the token manager (154) identifies a potential meaning of the neologism from within the dataset, and if the neologism is discovered in the knowledge graph but a corresponding edge is not discovered or not identified, then the token manager (154) extracts a new meaning of the neologism from within the knowledge graph. Details of neologism discovery with respect to the knowledge graph are shown and described in FIG. 3.

In an exemplary embodiment, the token manager (154) validates or subjects the potential neologism to a validation process, which includes the leverage of at least two explorations, with each exploration configured to generate a corroboration value of the potential neologism. In an embodiment, the at least two explorations may be chatbots, referred to herein as secondary chatbots different virtual venues than the chatbot, or a combination of different forms of virtual venue (172). For example, in an embodiment, one or more the explorations may be a virtual venue, such as but not limited to one or more social media web sites, one or more crowdsourced dictionaries, distributed repositories, etc. As shown herein by way of example, the dialog system (170) is configured with a plurality of secondary virtual venues (174) each in the form of a chatbot, shown herein as $chatbot_0$ (174$_0$), $chatbot_1$ (174$_1$), . . . , $chatbot_N$ (174$_N$). The quantity of secondary venues shown herein is for exemplary purposes and should not be considered limiting. In an exemplary embodiment, the secondary chatbots represent explorations or exploration venues configured to corroborate the neologism. For example, in an embodiment, the secondary chatbots enables secondary users to submit a corroboration value for the potential neologism. The corroboration values received via the secondary venues are processed by the director (156) and employed as a factor with respect to the knowledge graph update. For example, in an exemplary embodiment, the corroboration values are processed with respect to a configurable threshold, and in an embodiment, if the corroboration values meet or exceed the threshold then the neologism is verified and accepted and if the corroboration values do not meet the threshold then the neologism is not accepted. Accordingly, the secondary chatbots, or in an embodiment one or more secondary virtual environments, are leveraged by the token manager (154) to corroborate the neologism and selective update of the dataset and corresponding knowledge graph.

As shown, the director (156) is operatively coupled to the token manager (154). The director (156) is configured to amend the dataset and manage an amendment of the knowledge graph based on the identification and evaluation of the neologism. In an exemplary embodiment, the dataset amendment is conducted dynamically. As the knowledge graph is a representation of the dataset, the dynamic amendment of the dataset includes or is followed by an update of the knowledge graph, with the update being in the form of adding the neologism as a new node in the knowledge graph, adding the new meaning as a new edge in the knowledge graph, or a combination thereof.

The knowledge graph representation of the dataset may be leveraged by the neural network manager (158) to train an artificial neural network (ANN) with the dataset, and re-train the ANN in response to an update of a corresponding knowledge graph. In an embodiment, the ANN training is optional. As shown in the knowledge base (160) each dataset-knowledge graph pair is shown with an operatively coupled ANN, referred to herein as a model. For example, the $dataset_{0,0}$ (164$_{0,0}$) knowledge $graph_{0,0}$ (166$_{0,0}$) pair is shown with $model_{0,0}$ (168$_{0,0}$), $dataset_{0,1}$ (164$_{0,1}$) knowledge $graph_{0,1}$ (166$_{0,1}$) pair is shown with $model_{0,1}$ (168$_{0,1}$), . . . , and $dataset_{0,N}$ (164$_{0,N}$) knowledge $graph_{0,N}$ (166$_{0,N}$) pair is shown with $model_{0,N}$ (168$_{0,N}$), $dataset_{1,0}$ (164$_{1,0}$) knowledge $graph_{1,0}$ (166$_{1,0}$) pair is shown with $model_{1,0}$ (168$_{1,0}$), $dataset_{1,1}$ (164$_{1,1}$) knowledge $graph_{1,1}$ (166$_{1,1}$) pair is shown with $model_{1,1}$ (168$_{1,1}$), . . . , and $dataset_{1,N}$ (164$_{1,N}$) knowledge graph$_{1,N}$ (166$_{1,N}$) pair is shown with model$_{0,N}$ (168$_{1,N}$). As known in the art, the ANN is configured with a plurality of layers, including an input layer, one or more internal layers, also referred to herein as hidden layers, and an output layer. The goal of training the ANN is when completed the ANN can receive input data and generate output data classifying the received input data. For example, with respect to image recognition and classification, the ANN may receive an image as input data, convert the image to a set of pixels, process the set of pixels and corresponding pixel values through the ANN, and generate output data corresponding to the image, with the generated output classifying an interpretation of the received image. The ANN is not limited to image recognition. In an embodiment, the ANN may be training to recognize other mediums of expression, such as audio, and as such the scope of the ANN should not be considered limiting. Output from the ANN together with the synchronization assessment dictates selective issuance of a control signal, also referred to herein as an encoded action, with the control signal directed at a physical apparatus or component of the physical apparatus.

In an exemplary embodiment the control signal facilitates or causes a change in the object state, physically transforming the object from a first state to a second state. As shown herein by way of example, a physical hardware device (178) is operatively coupled to the server (110) across the network (105). In an embodiment, the device (178) may be operatively coupled to the server (110) or one or more of the systems (180), (182), (184), (186), (188), and (190). In an exemplary embodiment, the control signal selectively controls the operatively coupled physical hardware device (178), or in an embodiment a process controlled by software or a combination of the physical hardware device (178) and the software, with the control signal selectively modifying a physical functional aspect of the device (178). In an embodiment, the device (178) may be a first physical device operatively coupled to an internal component, or in an embodiment a second physical device and the issued first signal may modify an operating state of the internal component or the second device. For example, the first device (178) may be a product dispenser, and the control signal may modify or control a product dispensing rate to accommodate the rate at which the second device receives the dispensed product. In an embodiment, the director (156) computes a control action based on the generated context, and constructs or configures the control signal that aligns or is commensurate with the computed control action. In an exemplary embodiment, the control action may be applied as a feedback signal to directly control an event injection to maximize a likelihood of realizing an event or operating state of the device (178). In an embodiment, the ANN configures and generates the control signal in response to the dynamic update of a corresponding knowledge graph. Accordingly, the director (156) interfaces with a corresponding ANN to selectively generate and transmit the control signal to selectively control a physical state of the operatively coupled device (178), software, or a combination thereof.

As described herein, the AI platform (150) and corresponding tools (152)— (158) is operatively coupled to the data source (160), which includes one or more libraries with one or more datasets, knowledge graph, and ANNs therein. The system and associated tools, as described herein, leverages AI to support dynamic knowledge graph management, and in an embodiment dynamically issues a signal, also referred to herein as a control signal, to control or modify a physical hardware device, a process controlled by software, or a combination thereof. As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including input interfaces to receive requests and respond accordingly.

The AI platform (150) and the associated tools (152)— (158) leverage the data source (160) to support dynamic management of one or more knowledge graphs, and to leverage the knowledge graph and a corresponding trained or re-trained ANN to orchestrate of one or more actions directed to device and/or process optimization. Device processing data received across the network (105) may be processed by a server (110), for example IBM Watson® server, and the corresponding AI platform (150). As shown herein, the AI platform (150) together with the embedded tools (152)— (158) interface with a virtual environment exploration to identify and resolve a neologism, dynamically update a dataset and corresponding knowledge graph based on the neologism resolution, and in an embodiment generate one or more signals to physical modify an physical object state.

In some illustrative embodiments, the server (110) may be the IBM Watson® system available from International Business Machines Corporation of Armonk, New York, which is augmented with the mechanisms of the illustrative embodiments described hereafter. The tools (152)-(158), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to resolve a neologism and reflect the resolution by dynamic optimization of a dataset and corresponding knowledge graph.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store (190A), and mainframe computer (182) utilizes nonvolatile data store (182A). The nonvolatile data store (182A) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
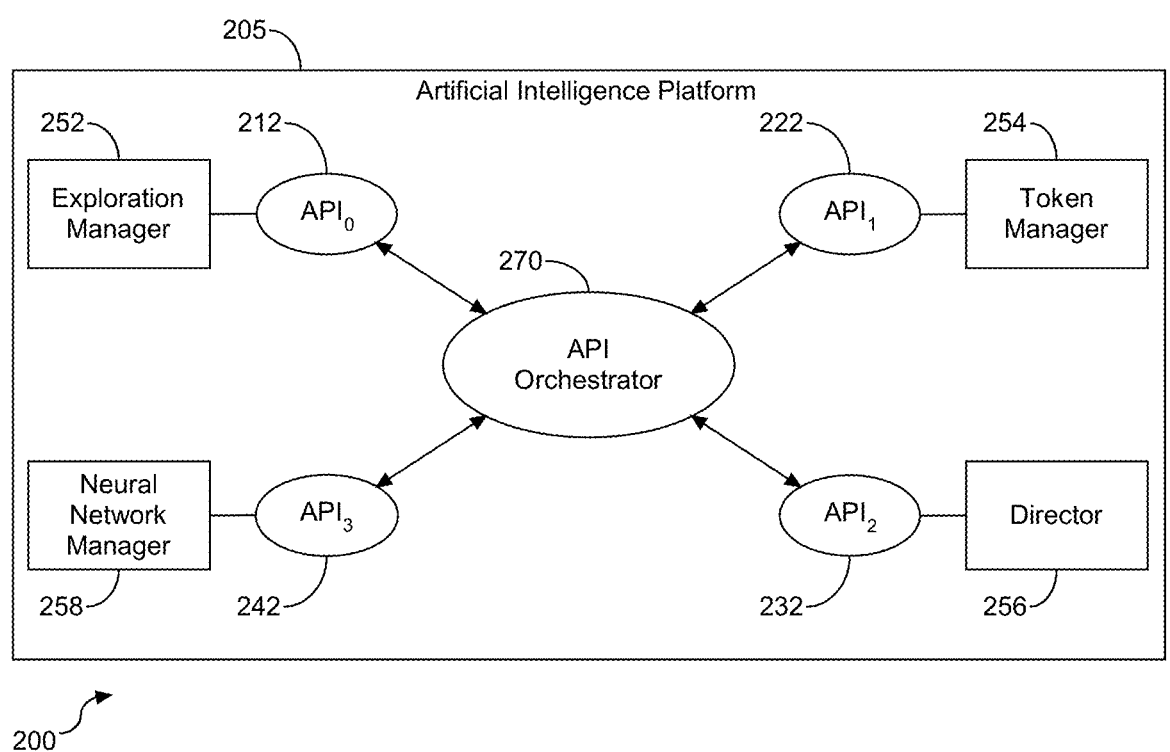
FIG. 2 depicts a block diagram illustrating the artificial intelligence platform and the associated tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)—(158) and their associated functionality. Referring to FIG. 2, a block diagram (200) is provided illustrating the tools (252)—(258) and their associated APIs. As shown, a plurality of tools is embedded within the Artificial Intelligence Platform (205), with the tools including the exploration manager (152) shown herein as (252) associated with $API_0$ (212), the token manager (154) shown herein as (254) associated with $API_1$ (222), the director (156) shown herein as (256) associated with $API_2$ (232), and the neural network manager (158) shown herein as (258) associated with $API_3$ (242). Each of the APIs may be implemented in one or more languages and interface specifications.

$API_0$ (212) provides functional support to exploration of one or more virtual environments, such as a virtual dialog environment, a chatbot, one or more social media web sites, one or more crowdsourced dictionaries, distributed repositories, or a combination thereof. $API_1$ (222) provides functional support for identifying and evaluating one or more neologisms present in the explored virtual environment. $API_2$ (232) provides functional support for dynamically amending a dataset and a corresponding knowledge graph based on the neologism(s) evaluation. $API_3$ (242) provides functional support for training an ANN with the dataset, and re-training the ANN with the selectively updated knowledge graph. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
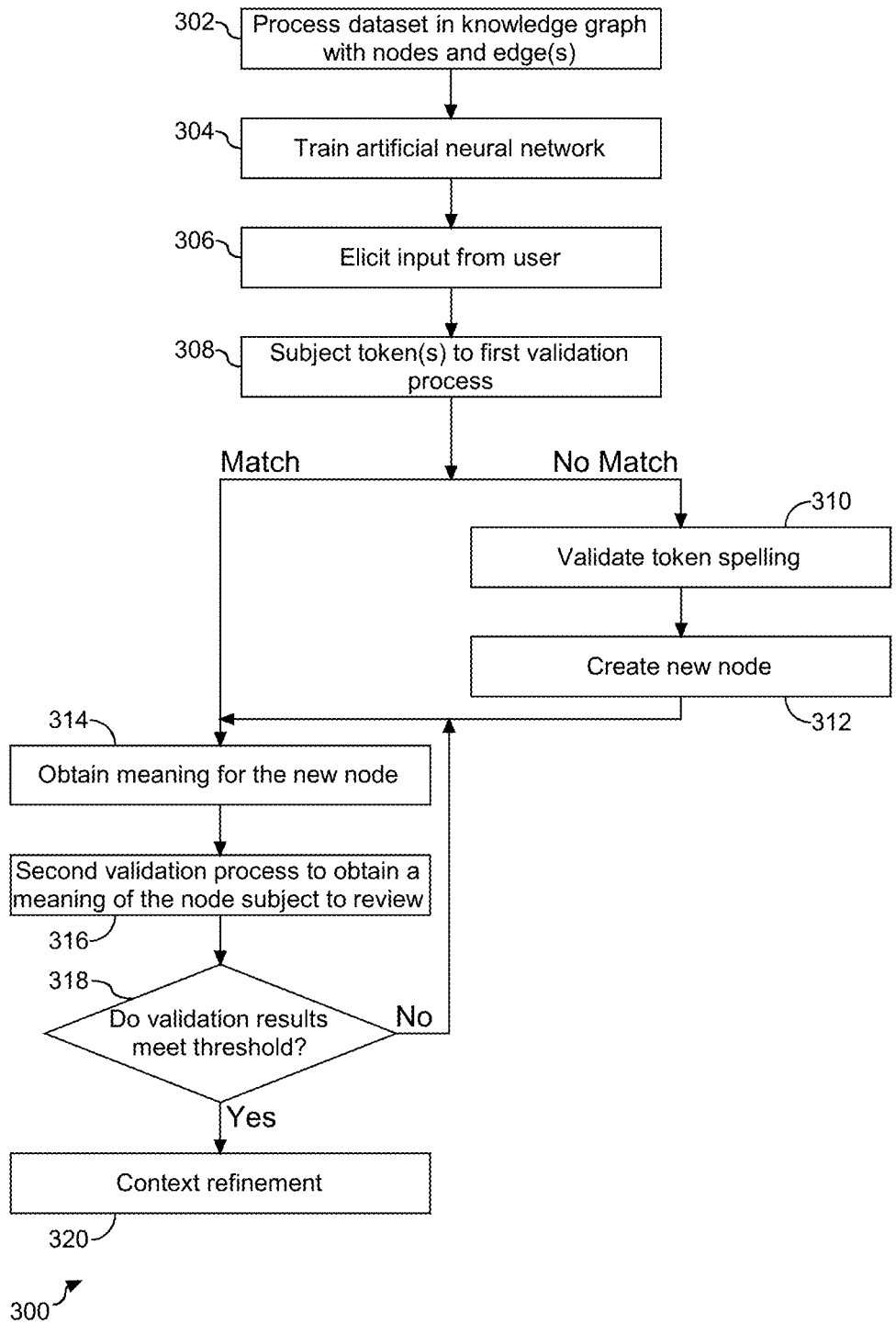
FIG. 3 depicts a flow chart illustrating a process for leveraging a virtual communication environment for selectively and dynamic amendment of a dataset and corresponding knowledge graph.

Referring to FIG. 3, a flow chart (300) is provided to illustrate a process for leveraging a virtual communication environment for selectively and dynamic amendment of a dataset and corresponding knowledge graph. A dataset is processed to train or support an AI model (302). In an exemplary embodiment, the dataset processing at step (302) converts the dataset, i.e. unstructured data, to a knowledge graph with nodes and edges, i.e. structured data. The knowledge graph gives shape and structure to the dataset, thereby making the data in the knowledge graph query able. The knowledge graph representation of the dataset may be leveraged to train an artificial neural network (ANN) (304), and in an embodiment re-train the ANN. In an embodiment, the ANN training is optional. The virtual environment in the form of the chatbot uses machine learning and deep learning elements of AI to develop an increasingly granular knowledge base of natural language understanding to discern the needs of the user, and AI tools to determine what the goal(s) of the user, e.g. what the user is trying to accomplish. Using the chatbot environment, input from a user is elicited (306). In an embodiment, the user input is subject to NLP and the words within the input are tokenized. It is understood in the art that tokenization is a process of separating a sequence of strings into pieces such as words, keywords, phrases, symbols, and other elements, individually referred to as tokens. The tokens can be individual words, phrases, or in an embodiment a sentence. In the process of tokenization, some characters may be discarded. Following receipt and tokenization at step (306), the token(s) are subject to validation, also referred to herein as a first validation or a first validation process, to ascertain if the token(s) is represented as a node in the knowledge graph (308). In an exemplary embodiment, the validation at step (308) is an initial evaluation directed at the token representation provided. If the validation at step (308) does not produce a match in the knowledge graph, a new node is created for the token representation (312). In an embodiment, a spelling validation of the token(s) may take place at step (310) prior to the new node creation to ensure that the representation of the natural language is correct, which in an embodiment may include a spelling correction. Accordingly, the token validation at steps (308) and (310) are employed to selectively amend the knowledge graph via creation of one or more nodes.

As shown, the initial evaluation at step (308) identifies if the token(s) subject to the validation are represented in the knowledge graph. Following creation of the new node at step (312) or a finding of a matching node in the knowledge graph, a meaning for the subject node is identified (314). In an exemplary embodiment, the meaning of the node will be leveraged to define one or more edges in the knowledge graph. The meaning of the token may be apparent from at least one of the corresponding edges, or the meaning of the token may not be apparent. The token may be in the form of a neologism, i.e. a newly coined word or expression, which by its very nature may be difficult to ascertain its meaning. A validation process (316), also referred to herein as a second validation or a second validation process, is shown herein to address the meaning of the token subject to review. The second validation process at step (316) solicits feedback from one or more virtual environment explorations. In an exemplary embodiment, the virtual environment is a chatbot that may be the same chatbot platform that identified the node and has subject the node to processing, or it may be a separate chatbot environment for soliciting definitions and explanations of the token(s). In an embodiment, the second validation process at step (316) is a form of crowdsourcing to obtain an explanation or explanatory data for the subject token(s). For example in an embodiment, the second validation process at step (316) may entail automatically crawling and scraping social media site, crowdsourced dictionaries, and/or distributed repositories. Similarly, in an embodiment, the second validation process at step (316) solicits definitions and explanations of the token(s) from two or more users, different from the user that provided the token(s). Accordingly, the second validation process is employed to corroborate the meaning of the token(s) through an interaction or a set of interactions.

In an exemplary embodiment, and as shown herein, the solicited definitions or explanations from the second validation process (316) may be subject to an evaluation or in an embodiment an evaluation process (318). For example, the platform employed to solicit validation of the token(s), may receive feedback from a plurality of users. It is understood that the token validation may include data that matches with the meaning of the token obtained at step (314), data that does not match the obtained token meaning, or a combination of matching and non-matching data. In an exemplary embodiment, the evaluation process at step (318) identifies a quantity or percentage of the solicited definitions or explanations that matches the token meaning in view of a quantity of those received. For example, in an embodiment the evaluation process (318) may include a percentage threshold for matching meanings. In an embodiment, the threshold is a configurable value. If at step (318) the evaluation validates the token meaning, then the knowledge graph is amended or otherwise expanded to reflect the validation (320) and the process returns to step (302) for re-training the ANN with the amended knowledge graph. Similarly, if at step (318) the evaluation does not validate the token meaning, then the process returns to step (314) to continue or re-institute the validation process.

As shown, herein, one or more AI interactive environments are employed to support and enable automatic amendment of the knowledge graph. In an exemplary embodiment, words are continuously collected from the chatbot environment as input is elicited input from a user, as shown at step (306). Validation of the collected words and their corresponding meaning or interpretation takes place through the second validation process, which in an embodiment, may be the same or a different chatbot platform. The knowledge graph is selectively and dynamically amended, e.g. expanded, in response to the validation process, which is followed by training or re-training the ANN in support of the chatbot platform. Accordingly, as shown herein, the automated knowledge graph expansion is dynamic in nature and leverages AI, and in an embodiment an ANN, to support a subsequent or future chatbot interaction.

Figure 4:
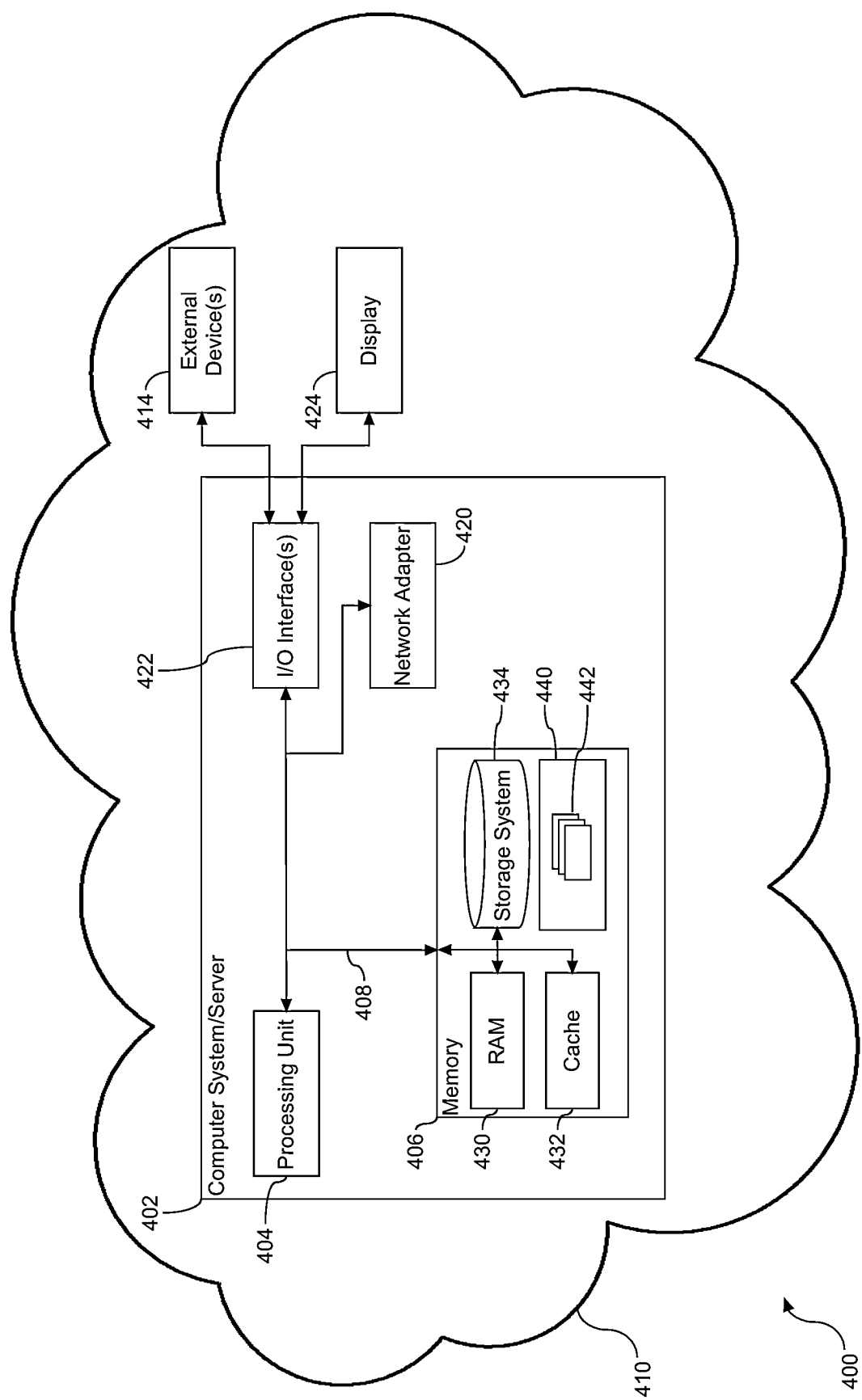
FIG. 4 depicts a block diagram illustrating an example of a computer system/server of a cloud based support system, to implement the system and processes described above with respect to FIGS. 1-3.

Embodiments shown and described herein may be in the form of a computer system for use with an intelligent computer platform for identifying a neologism through exploration of a virtual environment, and dynamically resolving the neologism and propagating the resolved neologism in a corresponding dataset and knowledge graph representation thereof. Aspects of the tools (152)-(158) and their associated functionality may be embodied in a computer system/server in a single location, or in one embodiment, may be configured in a cloud based system sharing computing resources. With reference to FIG. 4, a block diagram (400) is provided illustrating an example of a computer system/server (402), hereinafter referred to as a host (402) in a cloud computing environment (410), to implement the system, tools, and processes described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, host (402) is shown in the form of a general-purpose computing device. The components of host (402) may include, but are not limited to, one or more processors or processing units (404), e.g. hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to dynamically orchestrate of activities across one or more domains to minimize risk. For example, the set of program modules (442) may include the tools (152)— (158) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In one embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
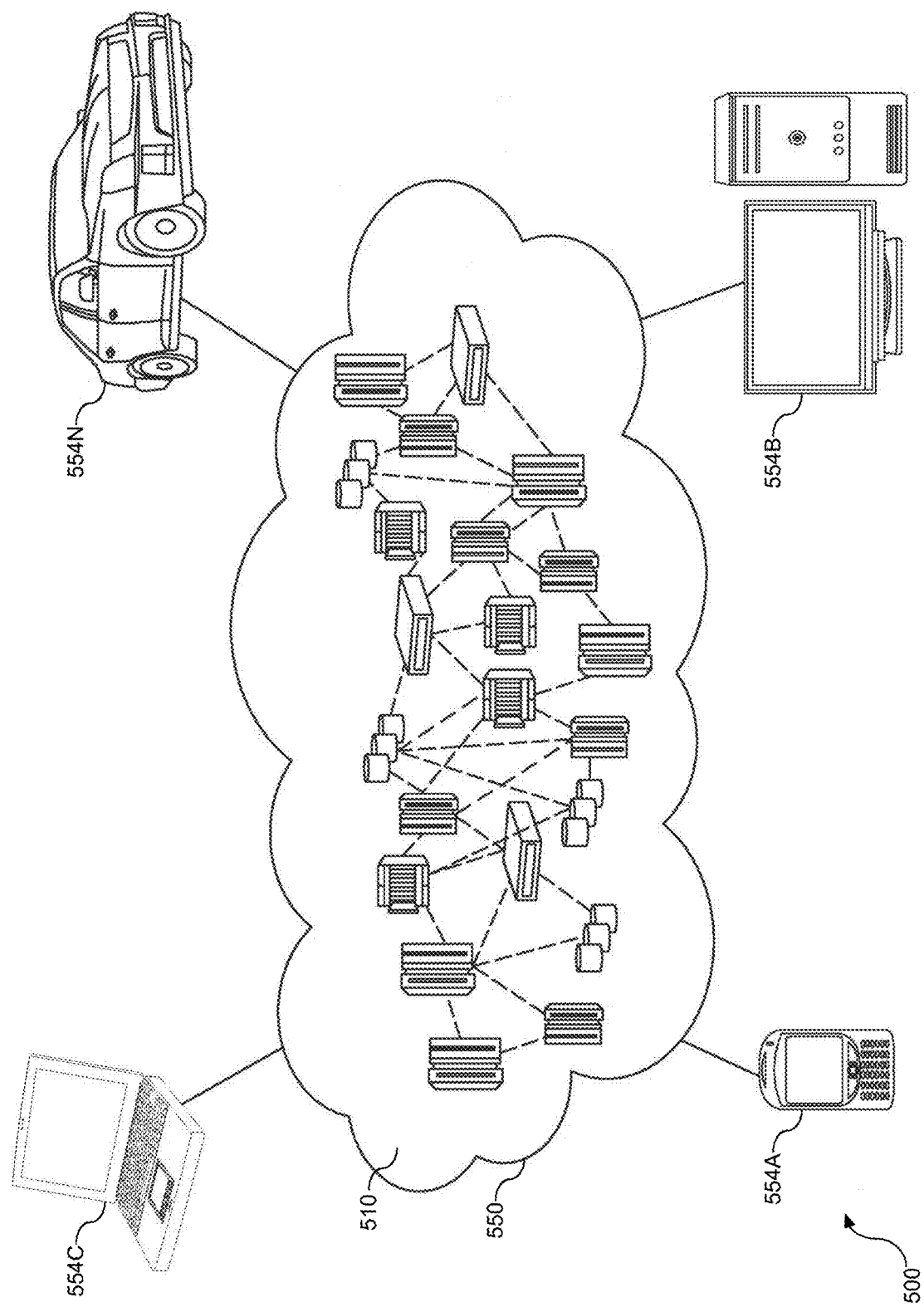
FIG. 5 depicts a block diagram illustrating a cloud computer environment.

Referring now to FIG. 5, an illustrative cloud computing network (500). As shown, cloud computing network (400) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
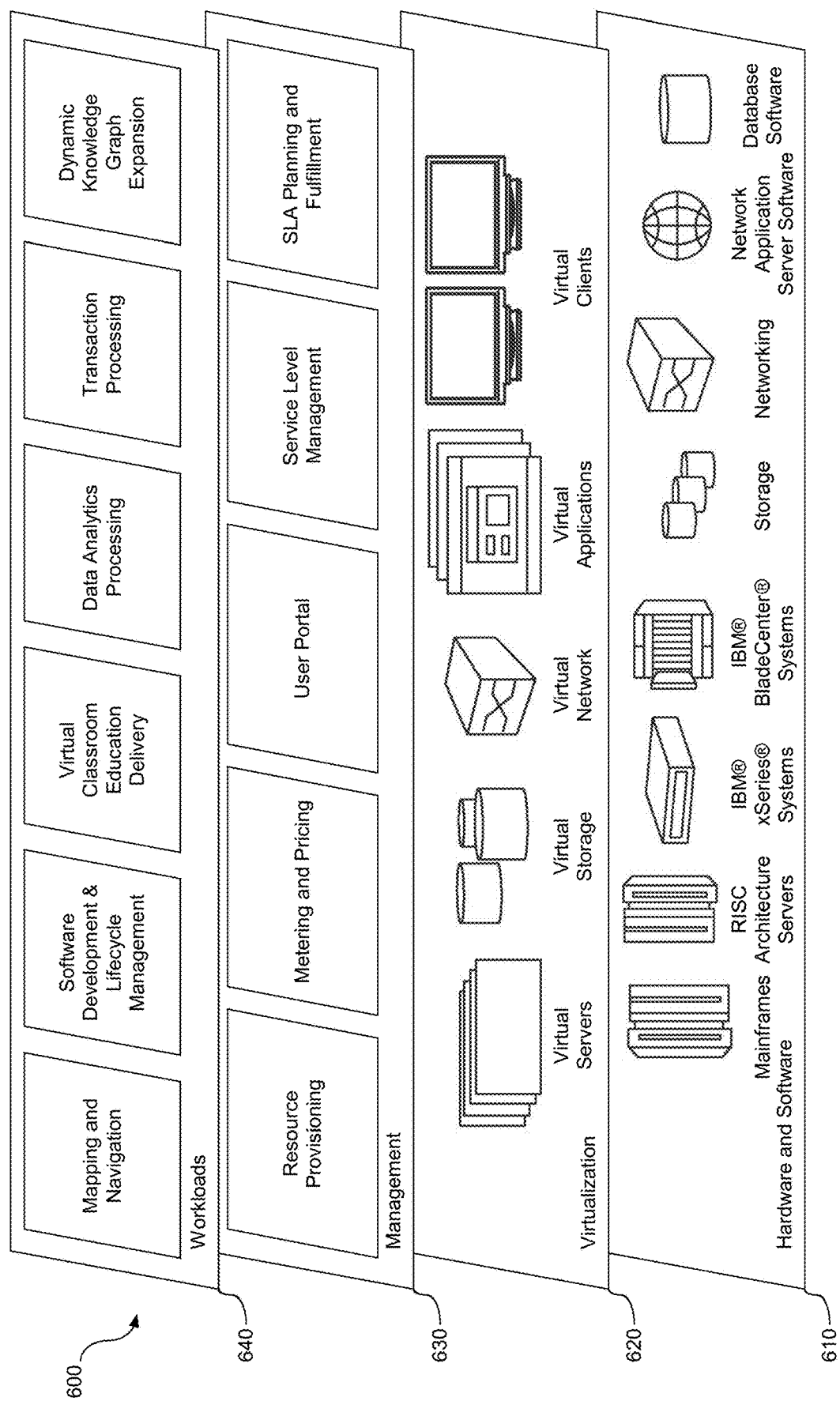
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic knowledge graph expansion.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an artificial intelligence platform to as supported by KG driven content generation for AR.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, dynamic management of the KG and the corresponding dataset, and in an exemplary embodiment dynamically generating a signal or instruction to a physical hardware device, software, or a process controlled by software may be carried out by different computing platforms or across multiple devices. Furthermore, the data source may be localized, remote, or spread across multiple systems. Accordingly, the scope of protection of the embodiments is limited only by the following claims and their equivalents.

What is claimed is:

1. A computer system comprising:
   a processing unit operatively coupled to memory;
   an artificial intelligence (AI) platform, in communication with the processing unit, having one or more tools to support selective and dynamic expansion of a dataset, the tools comprising:
   a token manager configured to identify a token representing a neologism in a virtual environment exploration, wherein the token is received from a user in an AI interactive environment corresponding to a first virtual venue, including the token manager to:
   identify the neologism in response to at least one of:
   discovering absence a representation of the identified token in the dataset, and obtain a new meaning of the identified token from the dataset; or
   discovering presence the representation of the identified token in the dataset and absence of a corresponding meaning or association, and extract a new meaning associated with the identified token from the dataset; and evaluate the identified token against a representation of the dataset to validate the identified token, comprising:

generating a first corroboration value using a first virtual exploration in a second virtual venue different from the first virtual venue;

generating a second corroboration value using a second virtual exploration in a third virtual venue different from the first and second virtual venues; and in response to determining that the first and second corroboration values satisfy one or more criteria, validating the new meaning for the identified token;

a director configured to dynamically amend the dataset responsive to the evaluation of the identified token, including:

update a knowledge graph representation of the dataset with the dynamically amended dataset, including add the identified token as a new node in the knowledge graph, add the new meaning as a new edge in the knowledge graph, or a combination thereof; and a neural network manager configured to:

re-train an artificial neural network (ANN) based on the updated knowledge graph; and generate a subsequent output of the AI interactive environment using the re-trained ANN.

2. The computer system of claim 1, wherein re-training the ANN is performed in response to updates of the knowledge graph.

3. The computer system of claim 1, wherein discovery of absence of the representation of the identified token in the dataset further comprises the token manager to validate spelling of the identified token, including selectively correct the spelling of the identified token, and evaluate the corrected token against the representation of the dataset.

4. The computer system of claim 1, wherein the dynamic amendment of the knowledge graph responsive to the evaluation includes the director to update the knowledge graph with the identified token as validated by the corroboration value.

5. The computer system of claim 1, further comprising the director configured to dynamically issue a control signal to an operatively coupled device, a process controlled by software, or a combination thereof, the control signal associated with the dynamically updated knowledge graph and configured to selectively control a physical state of the operatively coupled device, the software, or a combination thereof.

6. The computer system of claim 1, wherein the virtual environment includes a virtual venue including a virtual dialog environment, one or more social media web sites, one or more crowdsourced dictionaries, and distributed repositories, or a combination thereof.

7. A computer program product to support selective and dynamic expansion of a dataset, the computer program product comprising a computer readable storage medium having program code embodied therein, the program code executable by a processor to:

identify a token representing a neologism in a virtual environment exploration, wherein the token is received from a user in an AI interactive environment corresponding to a first virtual venue, including:

identifying the neologism in response to at least one of:

discovering absence a representation of the identified token in the dataset, and obtain a new meaning of the identified token from the dataset; or discovering presence the representation of the identified token in the dataset and absence of a corresponding meaning or association, and extract a new meaning associated with the identified token from the dataset; and evaluating the identified token against a representation of the dataset to validate the identified token, comprising:

generating a first corroboration value using a first virtual exploration in a second virtual venue different from the first virtual venue;

generating a second corroboration value using a second virtual exploration in a third virtual venue different from the first and second virtual venues; and in response to determining that the first and second corroboration values satisfy one or more criteria, validating the new meaning for the identified token;

dynamically amend the dataset responsive to the evaluation of the identified token, including:

update a knowledge graph representation of the dataset with the dynamically amended dataset, including add the identified token as a new node in the knowledge graph, add the new meaning as a new edge in the knowledge graph, or a combination thereof;

re-train an artificial neural network (ANN) based on the updated knowledge graph; and generate a subsequent output of the AI interactive environment using the re-trained ANN.

8. The computer program product of claim 7, wherein re-training the ANN is performed in response to updates of the knowledge graph.

9. The computer program product of claim 7, wherein the discovery of absence of the representation of the identified token in the dataset further comprises program code configured to validate spelling of the identified token, including selectively correct the spelling of the identified token, and evaluate the corrected token against the representation of the dataset.

10. The computer program product of claim 7, wherein the dynamic amendment of the knowledge graph responsive to the evaluation includes program code configured to update the knowledge graph with the identified token as validated by the corroboration value.

11. The computer program product of claim 7, further comprising program code configured to dynamically issue a control signal to an operatively coupled device, a process controlled by software, or a combination thereof, the control signal associated with the dynamically updated knowledge graph and configured to selectively control a physical state of the operatively coupled device, the software, or a combination thereof.

12. A computer implemented method comprising:

identifying a token representing a neologism in a virtual environment exploration, wherein the token is received from a user in an AI interactive environment corresponding to a first virtual venue, including:

identifying the neologism in response to at least one of:

discovering absence a representation of the identified token in the dataset, and obtaining a new meaning of the identified token from the dataset; or discovering presence the representation of the identified token in the dataset and absence of a corresponding meaning or association, and extracting a new meaning associated with the identified token from the dataset; and evaluating the identified token against a representation of the dataset to validate the identified token, comprising:

generating a first corroboration value using a first virtual exploration in a second virtual venue different from the first virtual venue;

generating a second corroboration value using a second virtual exploration in a third virtual venue different from the first and second virtual venues; and in response to determining that the first and second corroboration values satisfy one or more criteria, validating the new meaning for the identified token;

dynamically amending the dataset responsive to the evaluation of the identified token, including:

updating a knowledge graph representation of the dataset with the dynamically amended dataset, including add the identified token as a new node in the knowledge graph, add the new meaning as a new edge in the knowledge graph, or a combination thereof;

re-training an artificial neural network (ANN) based on the updated knowledge graph; and generating a subsequent output of the AI interactive environment using the re-trained ANN.

13. The computer implemented method of claim 12, wherein re-training the ANN is performed in response to updates of the knowledge graph.

14. The computer implemented method of claim 12, wherein the discovery of absence of the representation of the identified token in the dataset further comprises validating spelling of the identified token, including selectively correcting the spelling of the identified token, and evaluating the corrected token against the representation of the dataset.

15. The computer implemented method of claim 12 wherein the dynamic amendment of the knowledge graph responsive to the evaluation includes updating the knowledge graph with the identified token as validated by the corroboration value.

16. The computer implemented method of claim 12, further comprising dynamically issuing a control signal to an operatively coupled device, a process controlled by software, or a combination thereof, the control signal associated with the dynamically updated knowledge graph and configured to selectively control a physical state of the operatively coupled device, the software, or a combination thereof.

17. The computer implemented method of claim 12, wherein the virtual environment includes a virtual venue including a virtual dialog environment, one or more social media web sites, one or more crowdsourced dictionaries, and distributed repositories, or a combination thereof.

* * * * *